US011415974B2

(12) United States Patent
Saunders, Jr. et al.

(10) Patent No.: US 11,415,974 B2
(45) Date of Patent: *Aug. 16, 2022

(54) FACTORY MANAGEMENT AND MONITORING SYSTEMS AND METHODS

(71) Applicant: Stolle Machinery Company, LLC, Centennial, CO (US)

(72) Inventors: Jonathan Scott Saunders, Jr., Indaiatuba (BR); Ian Kenneth Scholey, Barnsley (GB); Karl S. Fleischer, Denver, CO (US); Roberto Michel De Oliveira, Indaiatuba (BR)

(73) Assignee: Stolle Machinery Company, LLC, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,968

(22) Filed: Jan. 13, 2021

(65) Prior Publication Data

US 2021/0132597 A1    May 6, 2021

Related U.S. Application Data

(63) Continuation of application No. 16/406,372, filed on May 8, 2019, now Pat. No. 10,921,797.

(60) Provisional application No. 62/669,472, filed on May 10, 2018.

(51) Int. Cl.
*G05B 23/02* (2006.01)
*G05B 13/02* (2006.01)
*G05B 19/418* (2006.01)

(52) U.S. Cl.
CPC ....... *G05B 23/0216* (2013.01); *G05B 13/021* (2013.01); *G05B 19/418* (2013.01)

(58) Field of Classification Search
CPC .............. G05B 23/0216; G05B 13/021; G05B 19/418; G05B 23/0272; G05B 2219/31457; G05B 23/0283; Y02P 90/02
See application file for complete search history.

(56) References Cited

U.S. PATENT DOCUMENTS

| | | |
|---|---|---|
| 9,254,514 B2 | 2/2016 | Farnham |
| 10,195,657 B1 | 2/2019 | Head |
| 10,466,662 B2 | 11/2019 | Kaufman |
| 2003/0098798 A1 | 5/2003 | Kato |

(Continued)

FOREIGN PATENT DOCUMENTS

EP        3246779 A1     11/2017

OTHER PUBLICATIONS

USPTO, "International Search Report and Written Opinion", PCT/US19/31297, dated May 8, 2019, 10 pp.

(Continued)

*Primary Examiner* — Charles R Kasenge
(74) *Attorney, Agent, or Firm* — Eckert Seamans Cherin & Mellott, LLC

(57) ABSTRACT

A factory management and monitoring system includes a processing unit structured to receive data from a plurality of sensors structured to monitor one or more factories or machines included in the factories, to analyze the received data, and to generate a user interface including the received data or information resulting from analysis of the received data, and a display structured to display the user interface.

18 Claims, 18 Drawing Sheets

(56) References Cited

U.S. PATENT DOCUMENTS

| | | |
|---|---|---|
| 2005/0174571 A1* | 8/2005 | Cochran .............. G01N 21/909 356/240.1 |
| 2007/0043464 A1 | 2/2007 | Zeif |
| 2008/0046104 A1 | 2/2008 | Van Camp |
| 2015/0220071 A1* | 8/2015 | Hahn ................... G05B 19/409 700/90 |
| 2015/0248826 A1* | 9/2015 | Hahn ................... G05B 19/409 340/539.11 |
| 2015/0360806 A1 | 12/2015 | Ojima et al. |
| 2016/0147205 A1 | 5/2016 | Kaufman |
| 2016/0147241 A1 | 5/2016 | Kaufman |
| 2016/0147242 A1 | 5/2016 | Kaufman |
| 2017/0160733 A1 | 6/2017 | Oostendorp et al. |
| 2018/0011454 A1 | 1/2018 | Kaufman |
| 2018/0201011 A1 | 7/2018 | Efner |

OTHER PUBLICATIONS

EP Patent Office, EP Application No. 19799346.2 Extended Search Report, dated Dec. 14, 2021, 22 pages.

\* cited by examiner

| | Production Performance Report | | |
|---|---|---|---|
| Start Date: Apr 10<br>End Date: Apr 11 | Time: 06:00<br>Time: 14:00 | Machine Type: Bodymaker | |
| Stop Cause Details | | | |
| Code | Description | | # of Occurences |
| 1 | STOPPED WITHOUT A FAULT PRESENT. | | 221 |
| 408 | PRX3-SHORT CAN | | 63 |
| 5 | DISCHARGE STOPPED | | 48 |
| 4 | DISCHARGE HIGH LIMIT | | 40 |
| 2 | INFEED LOW LIMIT | | 10 |
| 376 | MAIN DRIVE STOP PUSHBUTTON PRESSED | | 7 |
| 406 | BACK STOP PRESSED | | 6 |
| 411 | PRX6-BUCKET CONVEYOR JAM | | 6 |

FIG. 7B

Production Performance Report

Start Date: Apr 10  Time: 06:00  Machine ID: CUPPER_11
End Date: Apr 11  Time: 06:00  Serial Number: DACH165-5-31194

Details

| Date/Time | Cups This Shift | Cups Last Shift | Lifetime Cups | Machine Strokes PM |
|---|---|---|---|---|
| 2018-04-10 6:00 - 7:00 | 1,159,530 | 1,159,710 | 1,003,290 | 230 |
| 2018-04-10 7:00 - 8:00 | 261,450 | 1,159,710 | 1,160,190 | 250 |
| 2018-04-10 8:00 - 9:00 | 353,010 | 1,159,710 | 1,251,735 | 250 |
| 2018-04-10 9:00 - 10:00 | 448,170 | 1,159,710 | 1,346,865 | 230 |
| 2018-04-10 10:00 - 11:00 | 542,685 | 1,159,710 | 1,441,425 | 250 |
| 2018-04-10 11:00 - 12:00 | 614,370 | 1,159,710 | 1,513,065 | 250 |
| 2018-04-10 12:00 - 13:00 | 634,995 | 1,159,710 | 1,533,435 | 239 |
| 2018-04-10 13:00 - 14:00 | 774,690 | 1,159,710 | 1,673,100 | 250 |
| 2018-04-10 14:00 - 15:00 | 786,540 | 1,159,710 | 1,831,980 | 250 |
| 2018-04-10 15:00 - 16:00 | 316,245 | 786,645 | 2,001,270 | 250 |
| 2018-04-10 16:00 - 17:00 | 433,485 | 786,645 | 2,118,540 | 250 |
| 2018-04-10 17:00 - 18:00 | 604,530 | 786,645 | 2,289,555 | 250 |
| 2018-04-10 18:00 - 19:00 | 693,990 | 786,645 | 2,378,985 | 249 |
| 2018-04-10 19:00 - 20:00 | 802,980 | 786,645 | 2,488,005 | 250 |
| 2018-04-10 20:00 - 21:00 | 910,935 | 786,645 | 2,595,480 | 250 |
| 2018-04-10 21:00 - 22:00 | 1,059,495 | <N/A> | 2,744,835 | 250 |
| 2018-04-10 22:00 - 23:00 | 1,067,760 | 1,067,910 | 2,905,020 | 249 |
| 2018-04-10 23:00 - 24:00 | 313,950 | <N/A> | 3,066,840 | 250 |
| 2018-04-10 24:00 - 25:00 | 485,130 | 1,067,910 | 3,238,020 | 250 |
| 2018-04-11 1:00 - 2:00 | 610,005 | 1,067,910 | 3,362,655 | 250 |
| 2018-04-11 2:00 - 3:00 | 753,390 | 1,067,910 | 3,505,935 | 240 |
| 2018-04-11 3:00 - 4:00 | 923,955 | 1,067,910 | 3,676,545 | 240 |
| 2018-04-11 4:00 - 5:00 | 1,082,175 | 1,067,910 | 3,834,765 | 250 |
| 2018-04-11 5:00 - 6:00 | 1,085,070 | 1,067,910 | 3,837,615 | 249 |

FIG. 9C

FACTORY MANAGEMENT AND MONITORING SYSTEMS AND METHODS

CROSS-REFERENCE TO RELATED APPLICATIONS

This application is a continuation of U.S. patent application Ser. No. 16/406,372, filed May 8, 2019; which claims priority from U.S. Provisional Patent Application Ser. No. 62/669,472, filed May 10, 2018, entitled "FACTORY MANAGEMENT AND MONITORING SYSTEMS AND METHODS", the contents of which are incorporated herein by reference.

BACKGROUND

Field

The disclosed concept relates generally to factory management and monitoring systems and methods, and in particular, to factory management and monitoring systems and methods for can production lines.

Background Information

Different types of cans are manufactured for various purposes such as containers for food and beverages. The amount of cans that are produced each year by a single factory is immense. In a can production factory, efficiency is a significant concern. Downtime in a production line or less than optimal operation reduces the amount of cans produced by a factory. Given the amount of cans produced by a can production line, even small reductions in efficiency can have a significant impact of the volume of cans produced by the can production line. However, it can be difficult to even identify that a can production line is operating at less than optimal efficiency or to predict the reason for less than optimal production. It is also difficult to predict a failure that will cause downtime of a production line. There is room for improvement in can production factories.

SUMMARY

These needs and other are met by embodiments of the disclosed concept in which a factory management and monitoring system includes a processing unit structured to gather data from sensors associated with machines located in one or more factories and generate a user interface to show the gathered data.

In accordance with an aspect of the disclosed concept, a factory management and monitoring system comprises: a processing unit structured to receive data from a plurality of sensors structured to monitor one or more factories or machines included in the factories, to analyze the received data, and to generate a user interface including the received data or information resulting from analysis of the received data; and a display structured to display the user interface.

In accordance with another aspect of the disclosed concept, a factory management and monitoring method comprises: receiving data from a plurality of sensors structured to monitor one or more factories or machines included in the factories; analyzing the received data; generating a user interface including the received data or information resulting from analysis of the received data; and displaying the user interface.

In accordance with another aspect of the disclosed concept, a non-transitory computer readable medium storing one or more programs, including instructions, which when executed by a computer, causes the computer to perform a factory management and monitoring method is provided. The method comprises: receiving data from a plurality of sensors structured to monitor one or more factories or machines included in the factories; analyzing the received data; generating a user interface including the received data or information resulting from analysis of the received data; and displaying the user interface.

BRIEF DESCRIPTION OF THE DRAWINGS

FIGS. 7A and 7B are example aggregated bodymaker reports in accordance with an example embodiment of the disclosed concept;

FIGS. 9A-C are example single cupper reports in accordance with an example embodiment of the disclosed concept.

DESCRIPTION OF THE PREFERRED EMBODIMENTS

Figure 1:
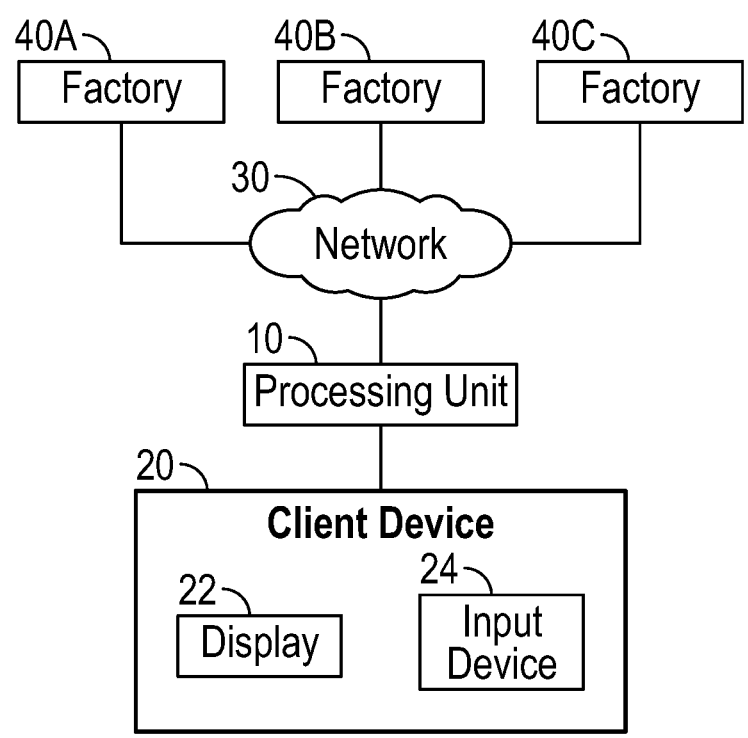
FIG. 1 is schematic diagram of a factory management system in accordance with an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein. As employed herein, the statement that two or more parts are "coupled" together shall mean that the parts are joined together either directly or joined through one or more intermediate parts.

As employed herein, the term "processor" shall mean a controller with analog and/or digital devices connected to it, that can store, retrieve, and process data; a microprocessor; a microcontroller; a microcomputer; a central processing unit; or any suitable processing device or apparatus.

The disclosed concept is related to factory management and monitoring systems and methods. In accordance with an example embodiment of the disclosed concept, the factory management and monitoring system is applied to can production. An example can production factory includes a can production line with machines named near to their function such as cuppers, bodymakers, washers, coat ovens, base coaters, decorators, internal spray machines, neckers, light testers, and palletizers. The can production line may include other machines and other intermediate machinery such as conveyance machinery. Various sensors are disposed throughout the can production line to monitor various parameters of the can production line. The sensors may monitor various characteristics of the machines on the can production line. For example, the sensors may monitor the running speeds of cuppers and bodymakers on the can production line. However, it contemplated that the sensors may monitor numerous different characteristics of each machine in the production line, general characteristics of the production line itself, and characteristics of the product being produced on the production line, locations of the product on the production line, or other types of characteristics without departing from the scope of the disclosed concept.

Figure 2:
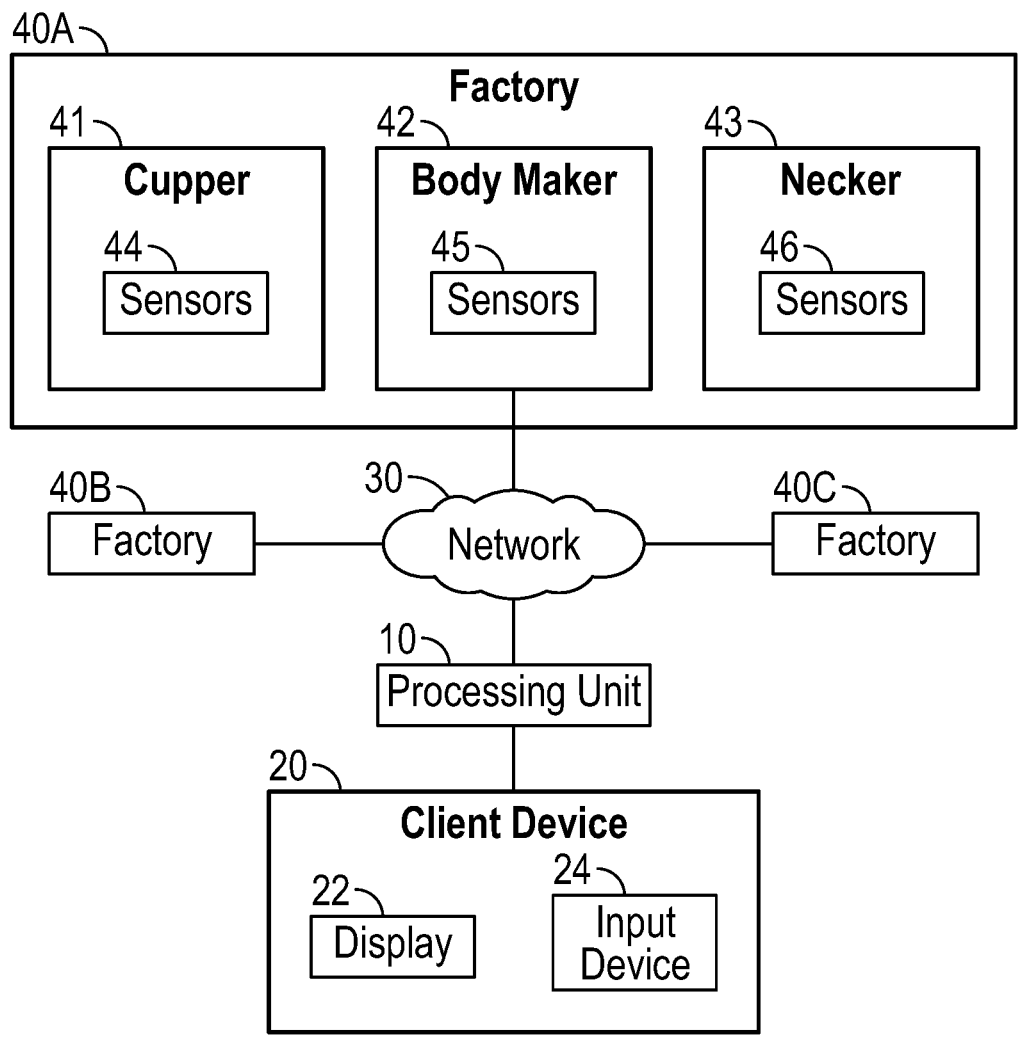
FIG. 2 is a schematic diagram of a factory management system including an exemplary factory shown in more detail in accordance with an exemplary embodiment of the disclosed concept.

FIG. 1 is schematic diagram of a factory management system in accordance with an exemplary embodiment of the disclosed concept and FIG. 2 is a schematic diagram of a factory management system including an exemplary factory 40A shown in more detail in accordance with an exemplary embodiment of the disclosed concept.

The factory management and monitoring system includes a processing unit 10 and a client device 20. The factory management and monitoring system further includes a number of factories 40A, 40B, 40C. Each of the factories 40A, 40B, 40C includes a can production line including a number of machines such as a cupper 41, a bodymaker 42, and a necker 43 (shown in FIG. 2). Each of the factories 40A, 40B, 40C also includes a number of sensors 44, 45, 46 (shown in FIG. 2). The sensors 44, 45, 46 are each associated with corresponding machines such as the cupper 41, the bodymaker 42, and the necker 43. It will be appreciated that FIG. 2 shows an example of some machines and associated sensors in a can production line. However, it will also be appreciated that each of the factories 40A, 40B, 40C may include additional machines such as, without limitation, washers, coat ovens, base coaters, decorators, internal spray machines, light testers, and palletizers without departing from the scope of the disclosed concept. It will also be appreciated that the factories 40A, 40B, 40C may include multiples of the same type of machine without departing from the scope of the disclosed concept. The sensors 44, 45, 46 are structured to monitor various characteristics of their associated machines on the can production line. For example, the sensor 41 may monitor the running speed of its associated cupper 41 and the sensor 45 may monitor the running speed of its associated bodymaker 42 on the can production line. However, it contemplated that the sensors 44, 45, 46 may monitor numerous different characteristics of their associated machine in the production line. It will also be appreciated that sensors may be provided that monitor general characteristics of the production line itself, characteristics of the product being produced on the production line, locations of the product on the production line, or other types of characteristics without departing from the scope of the disclosed concept. It will be appreciated that the disclosed concept is not limited to the number of machines and sensors shown in FIG. 2, but rather additional machines and sensors may be provided in each factory 40A, 40B, 40C without departing from the scope of the disclosed concept. It will also be appreciated that any number of factories 40A, 40B, 40C may be provided without departing from the scope of the disclosed concept.

The processing unit 10 is structured to receive the outputs of the sensors 44, 45, 46 (e.g., without limitation, monitored characteristics of their associated machines, etc.). The processing unit 10 may receive the outputs of the sensors 44, 45, 46 via a network 30 (e.g. without limitation, the internet) or any other suitable communication link.

In some exemplary embodiments, the client device 20 includes a display 22 and an input device 24. The display 22 may be any suitable type of display such as, without limitation, an LCD, LED, or other suitable type of display. The input 24 device may be any suitable type of device for receiving input from a user. For example and without limitation, the input device 24 may be a keyboard and/or mouse, a touch screen, or any other suitable type of device for receiving input from the user. The client device 20 may be a computer or other type of processing device. It will be appreciated by those having ordinary skill in the art that the client device 20 may be incorporated into the processing unit 10 or vice versa without departing from the scope of the disclosed concept.

The processing unit 10 may be a computer, a server, or other type of processing device. In some example embodiments, the processing unit 10 and client device 20 communicate with each other via a network connection or other suitable type of connection. The processing unit 10 is structured to gather data from the various sensors 44, 45, 46 and to generate a user interface to view the data. The user interface may be displayed at the processing unit 10 itself in example embodiments where the processing unit 10 includes a display or communicated to the client device 20 and displayed on the display 22 of the client device 20. The data may be gathered from the sensors via a network 30 such as the Internet or another type of network. It is contemplated that any suitable method for communicating the data from the sensors 44, 45, 46 to the processing unit 10, including any methods using intermediate collection points or repositories, may be employed without departing from the scope of the disclosed concept. It is also contemplated that the processing unit 10 may gather data from sensors 44, 45, 46 located at multiple factories 40A, 40B, 40C. As previously noted, FIGS. 1 and 2 illustrate exemplary factories 40A, 40B, 40C, but it will be appreciated that the processing unit 10 may gather data from sensors associated with any number of machines and factories without departing from the scope of the disclosed concept. The processing unit 10 may be located remote from the one or more factories 40A, 40B, 40C where the sensors 44, 45, 46 are located.

The processing unit 10 is structured generate a user interface to view the data gathered from the sensors 44, 45, 46. The user interface may displayed on the same device as the processing unit 10, or it may be displayed on a device remote from the processing unit 10, such as the display 22 of the client device 20. For example and without limitation, the processing unit 10 may be located in a server or other computing device at one location and the user may access and interact with the user interface via the client device 20 located elsewhere, but connected via a network to the processing device 10. The processing unit 10 is also structured to analyze the data gathered from the sensors 44, 45, 46. For example and without limitation, the processing unit 10 may compare data gathered from the sensors 44, 45, 46 including one or more particular characteristics of an associated machine to threshold values and set an alarm condition if the characteristics exceed the threshold limits. The alarm condition may be displayed on the user interface to alert a user of the condition. For example and without limitation, a sensor associated with a washer in a factory may monitor a characteristic of the washer such as the burner temperature of the washer. The processing unit 10 may analyze the temperature and set an alarm condition when the temperature exceeds a predetermined threshold temperature. When the temperature exceeds the predetermined threshold, the processing unit 10 may cause an alarm to be displayed on the user interface such that a user viewing the user interface at the processing unit 10 or client device 20 can be made aware of the alarm condition. It will be appreciated that this is an exemplary alarm condition and any number of different types of alarm conditions without departing from the scope of the disclosed concept. For example, the processing unit 10 may set alarm conditions based on the outputs of one sensor, combinations of outputs of multiple sensors, combinations of outputs of multiple sensors across multiple factories, etc. without departing from the scope of the disclosed concept.

It is contemplated that the processing unit 10 may analyze the data gathered from the sensors 44, 45, 46 in various types of manners to derive any information pertinent to operation of the factory or factories 40A, 40B, 40C without departing from the scope of the disclosed concept. It is also contemplated that the displayed user interface may include any data gathered by the sensors 44, 45, 46 or any information resulting from analysis by the processing unit 10 without departing from the scope of the disclosed concept. It is further contemplated that the displayed user interface may include any data in a manner suitable for a user to contemplate, such as graphs, numerical representations, or any other suitable manner of displaying data.

In some example embodiments of the disclosed concept, the processing unit 10 may analyze the data gathered from sensors 44, 45, 46 using artificial intelligence or machine learning techniques. For example and without limitation, the processing unit 10 may use artificial intelligence or machine learning techniques to predict machine failure or maintenance, material usage, to optimize a machine or factory, or any other suitable application based on the gathered data. As an example, the processing unit 10 may analyze data gathered from various factories using artificial intelligence techniques to recognize optimal operating patterns based on specified goals such as efficiency or output capacity. It will be appreciated by those having ordinary skill in the art that the processing unit 10 may analyze the data gathered from sensors 44, 45, 46 or other sensors using any number of artificial intelligence or machine learning techniques without departing from the scope of the disclosed concept. It will also be appreciated that in some example embodiments, the processing unit 10 may control machines in one or more factories based on such analysis.

The user interface is structured to be interactive. For example and without limitation, a user may interact with different areas of the user interface to change the arrangement or format of the information that is displayed. The input device 24 of the client device 20 or, in some example embodiments, an input device of the processing unit 10, may be used to input commands to interact with the user interface. For example and without limitation, the user interface may include an overall factory view that displays a representation of an entire production line and data pertinent to the overall production line. The user may interact with the user interface (e.g., via the input device 24) to cause the user interface to show a particular machine (e.g., cupper, bodymaker, necker, etc.) on the production line and data pertinent to the particular machine. It is contemplated that the user interface may include displays pertinent to a set of factories, a selected factory, a selected machine, or a particular product, and that the user may interact with the user interface to switch between these types of displays. It is also contemplated that the user may interact with the user interface to customize the data that is displayed.

In some example embodiments of the disclosed concept, the user may interact with the user interface to control aspects of the factories 40A, 40B, 40C or the machines in the factories. For example, the processing unit 10 may communicate with controllers of various machines in the factories 40A, 40B, 40C. In some example embodiments, the user may interact with the user interface and manipulate an alarm signal to be sent from the processing unit 10 to one or more of the machines (e.g., without limitation, the cupper 41, the bodymaker 42, or the necker 43) located at one or more of the factories 40A, 40B, 40C to alert an operator remotely located at one of the factories 40A, 40B, 40C, invoke a stop to the machine, or adjust a set of parameters that would tune the operation of the machine in a specified manner, provided the user has security level access authenticated followed by specific protocol which includes but is not limited to interacting with personnel near the machine or those responsible for machine operation by means of user input acknowledgement, before a change is executed.

Figure 3:
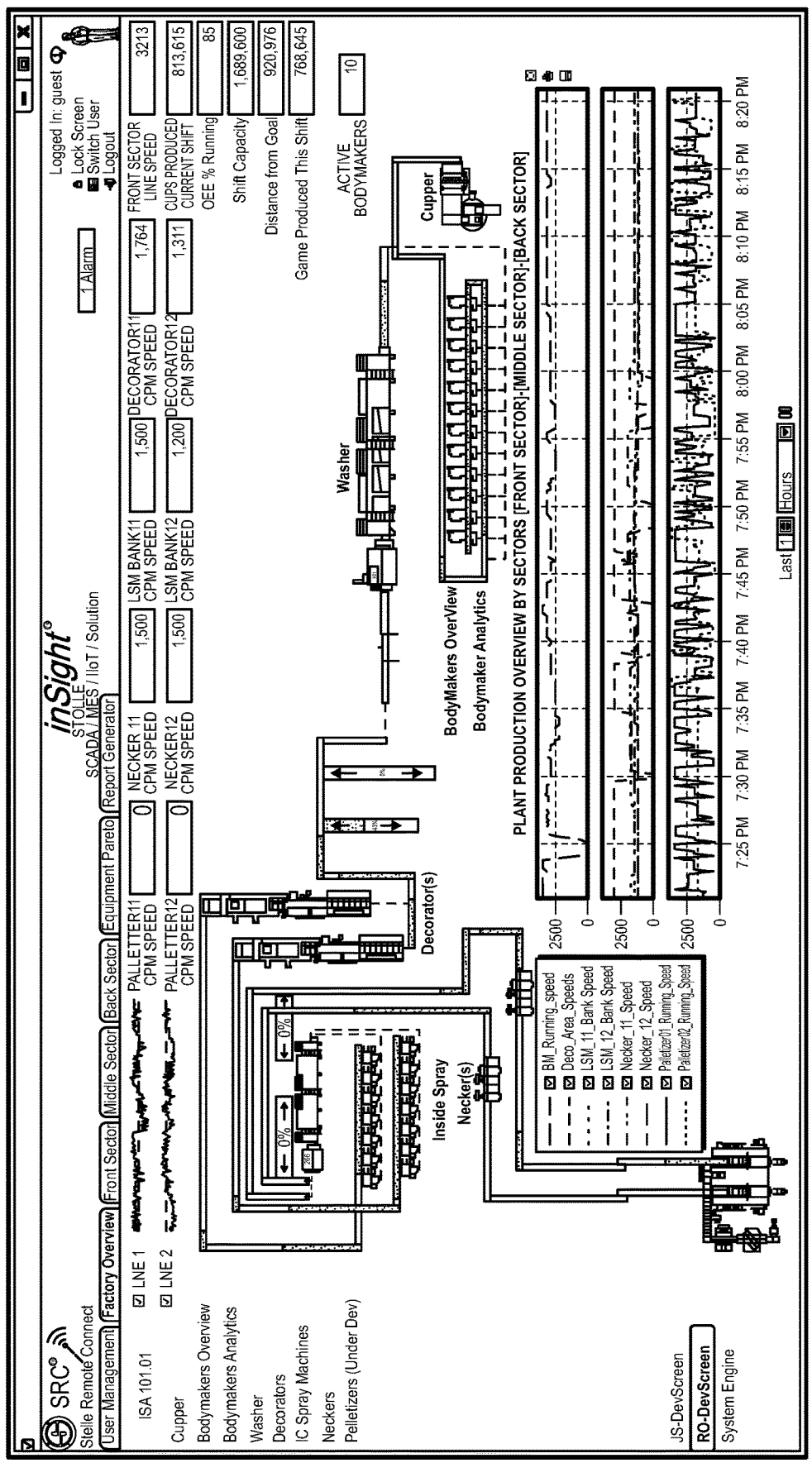
FIG. 3 is a screenshot of a factory overview screen in accordance with an exemplary embodiment of the disclosed concept.

FIGS. 3-6 are examples of the displayed user interface in accordance with example embodiments of the disclosed concept. The user may switch between the various examples shown in FIGS. 3-6 by interacting with the user interface via the input device 24 or other suitable input devices. FIG. 3 is a screenshot of a factory overview screen in accordance with an exemplary embodiment of the disclosed concept. As shown in FIG. 3, data gathered from sensors associated with various machines in a factory are shown. The cans per minute necker speed is an example of a characteristic of a necker, gathered from a sensor or sensors associated with the necker, and shown on the user interface. From the user interface, the user can easily view the cans per minute necker speed, as well as various other characteristics of the necker, other machines, or other characteristics of the operation of the factory gathered from other sensors.

Figure 4:
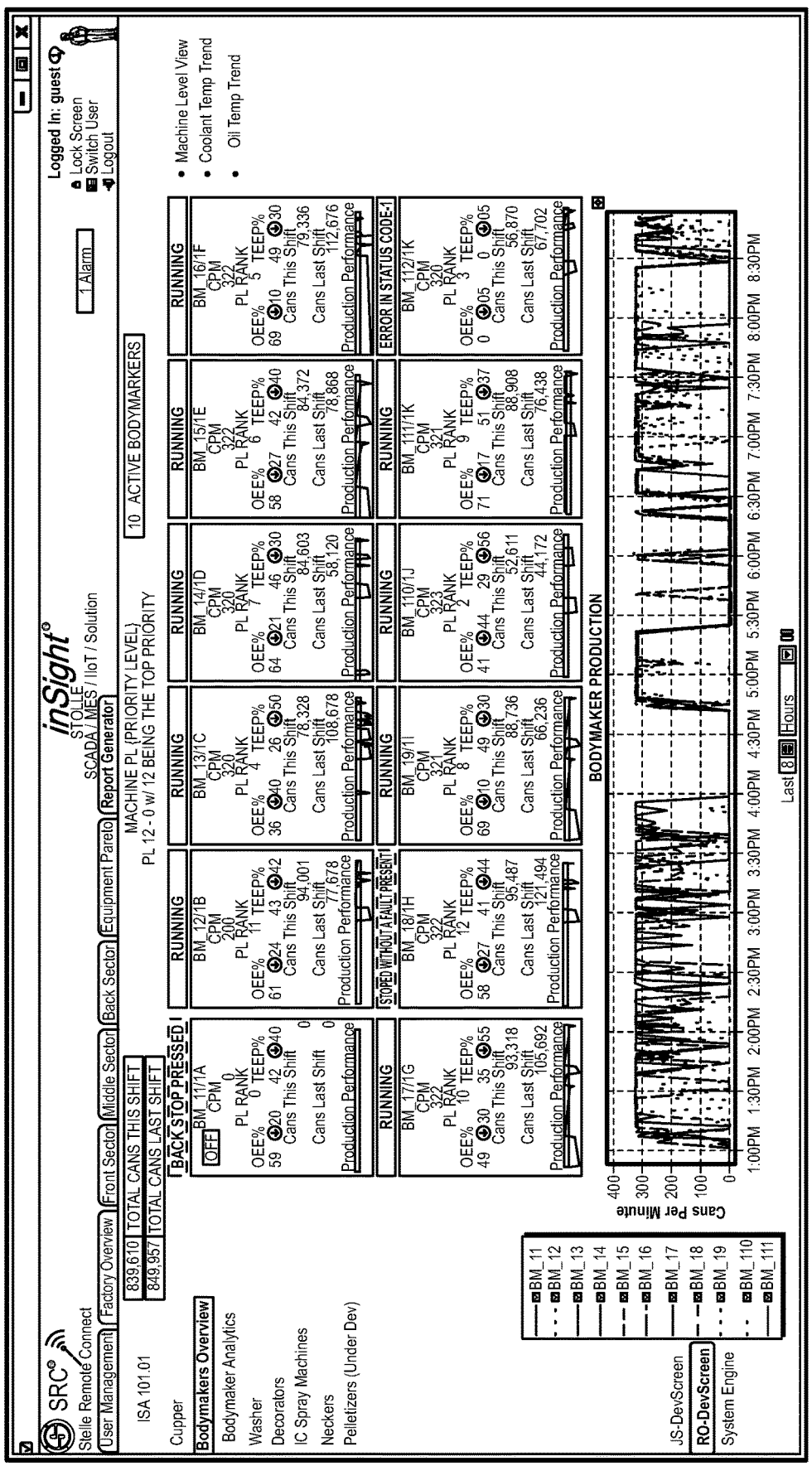
FIG. 4 is a screenshot of a bodymaker overview screen in accordance with an exemplary embodiment of the disclosed concept.

FIG. 4 is a screenshot of a bodymaker overview screen in accordance with an exemplary embodiment of the disclosed concept. In this example, the characteristics of multiple bodymakers are shown in the user interface. The bodymakers may be located in one factory or in multiple factories.

Figure 5:
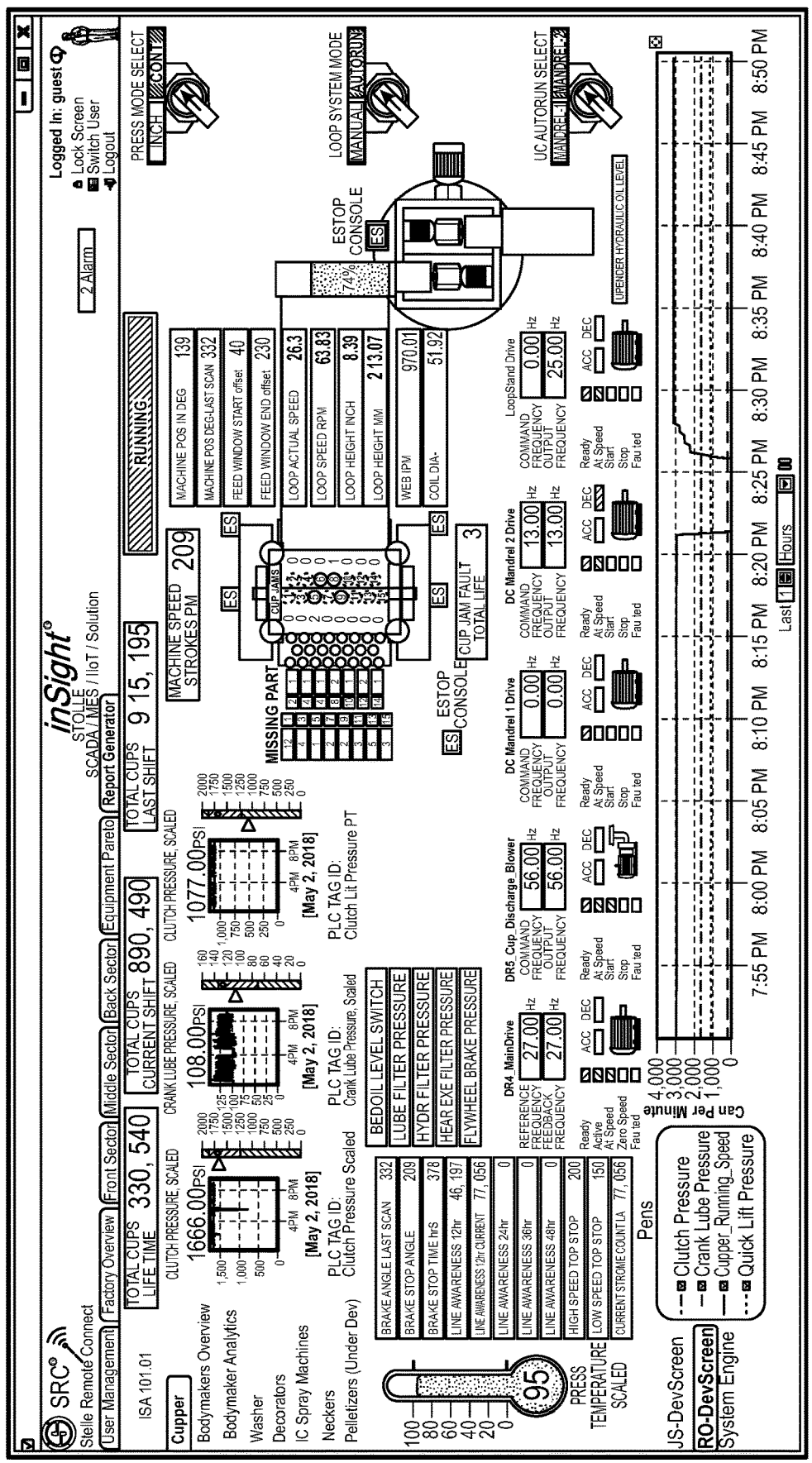
FIG. 5 is a screenshot of a cupper overview screen in accordance with an exemplary embodiment of the disclosed concept.

FIG. 5 is a screenshot of a cupper overview screen in accordance with an exemplary embodiment of the disclosed concept. In this example, the characteristics of a cupper are shown in the user interface. For example, the speed of the cupper, total cups made over the life of the cupper, as well as various characteristics of components of the cupper are shown in the user interface. In this example of the user interface, a user can easily contemplate many aspects of the operation and the status of the cupper remotely at the client device 20 or processing unit 10.

Figure 6:
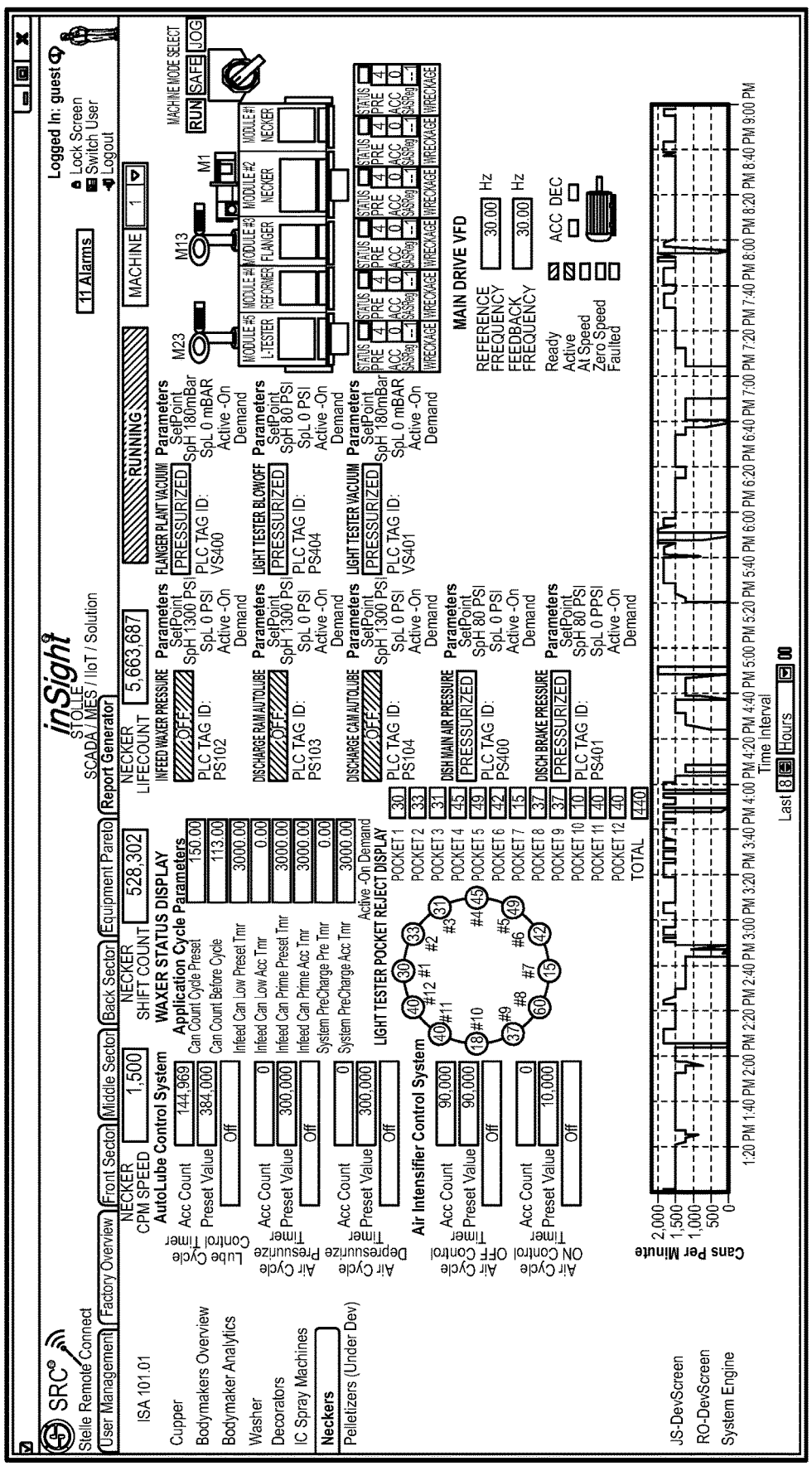
FIG. 6 is a screenshot of a necker overview screen in accordance with an exemplary embodiment of the disclosed concept.

FIG. 6 is a screenshot of a necker overview screen in accordance with an exemplary embodiment of the disclosed concept. In this example, the characteristics of a necker are shown in the user interface. Similar to the previous example, the speed of the necker, total units over the lifetime of the necker, as well as various characteristics of the components of the necker are shown. In this example of the user interface, a user can easily contemplate many aspects of the operation and the status of the necker remotely at the client device 20 or processing unit 10.

The examples shown in FIGS. 4-6 are examples of the user interface and types of data associated with the machines in one or more factories that can be shown in the user interface. It will be appreciated that the user interface may also show information associated with different types of machine or different types of information without departing from the scope of the disclosed concept. By interacting with the user interface and viewing the information shown on the user interface, the user may contemplate the operation and status of a single machine, multiple machines, a single factory, multiple factories, or any combination thereof. In this manner, the user may interact with the user interface to customize what is shown to view pertinent data in assessing the operation and/or status of machines and/or factories. The user may use such information to optimize and/or maintain machines and/or factories, generate material orders, or perform other actions associated with the machines and/or factories. In some example embodiments of the disclosed concept, such actions may be made via commands issued through the user interface to control one or more of the machines. Additionally, as previously noted, the user interface may show alarm conditions determined by the processing unit 10. Via these alarm conditions, the user may be made aware of the alarm conditions and take remedial action. In some example embodiments of the disclosed concept, such remedial action may be made via commands issued through the user interface.

It is contemplated that the processing unit 10 may limit the information included in the user interface based on the rights of the user. For example, one type of user may be able to access one set of data through the user interface while another type of user may be able to access a different set of data through the user interface.

The processing unit 10 may also be structured generate and/or display reports based on the data gathered from the sensors 44, 45, 46 or information resulting from analysis of the data gathered from the sensors 44, 45, 46. The reports may be, for example and without limitation, selected information that summarizes operation and/or performance of production lines or particular machines on the production line. A user may cause selected reports to be generated by interacting with the user interface.

Figure 7A:
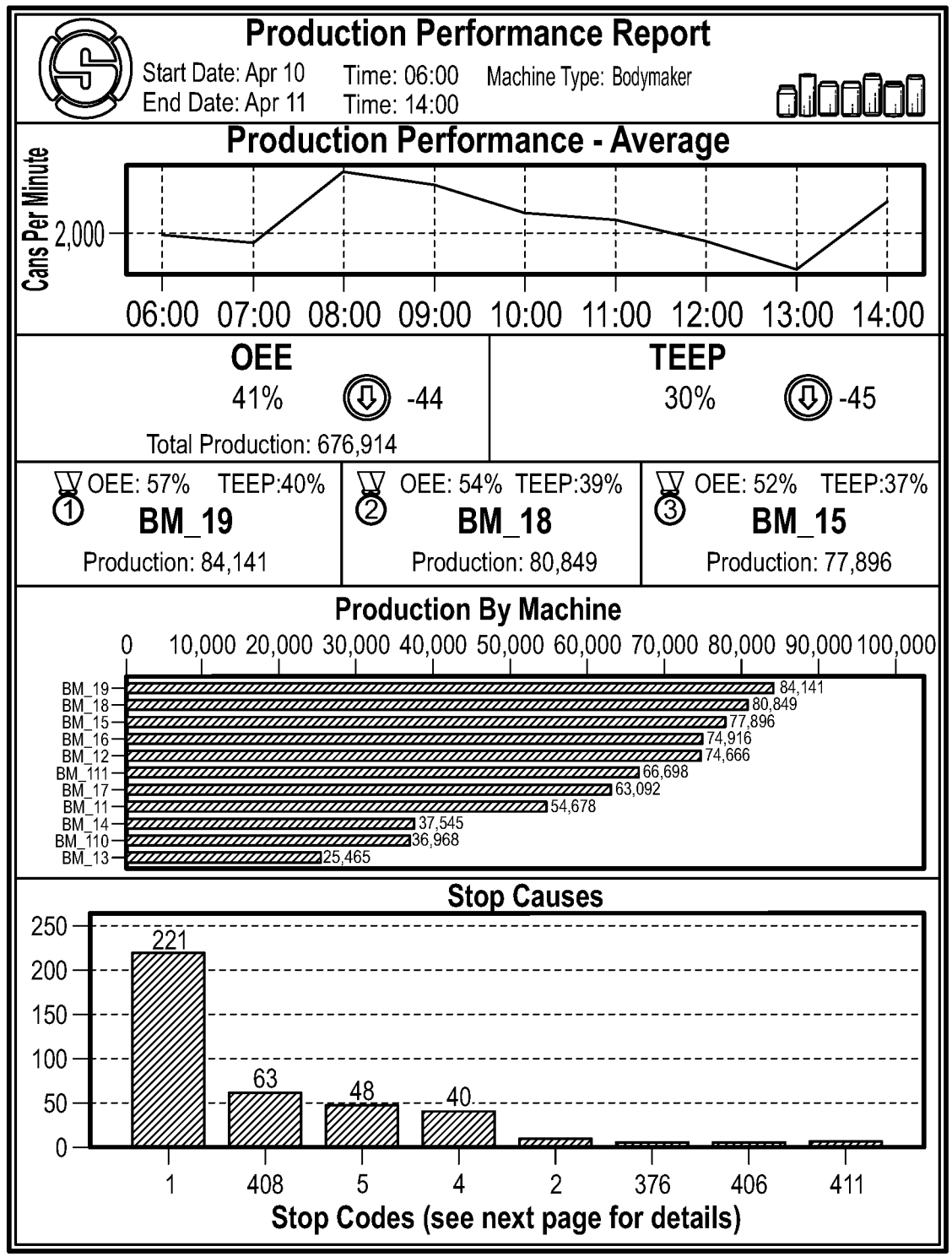
Figure 8A:
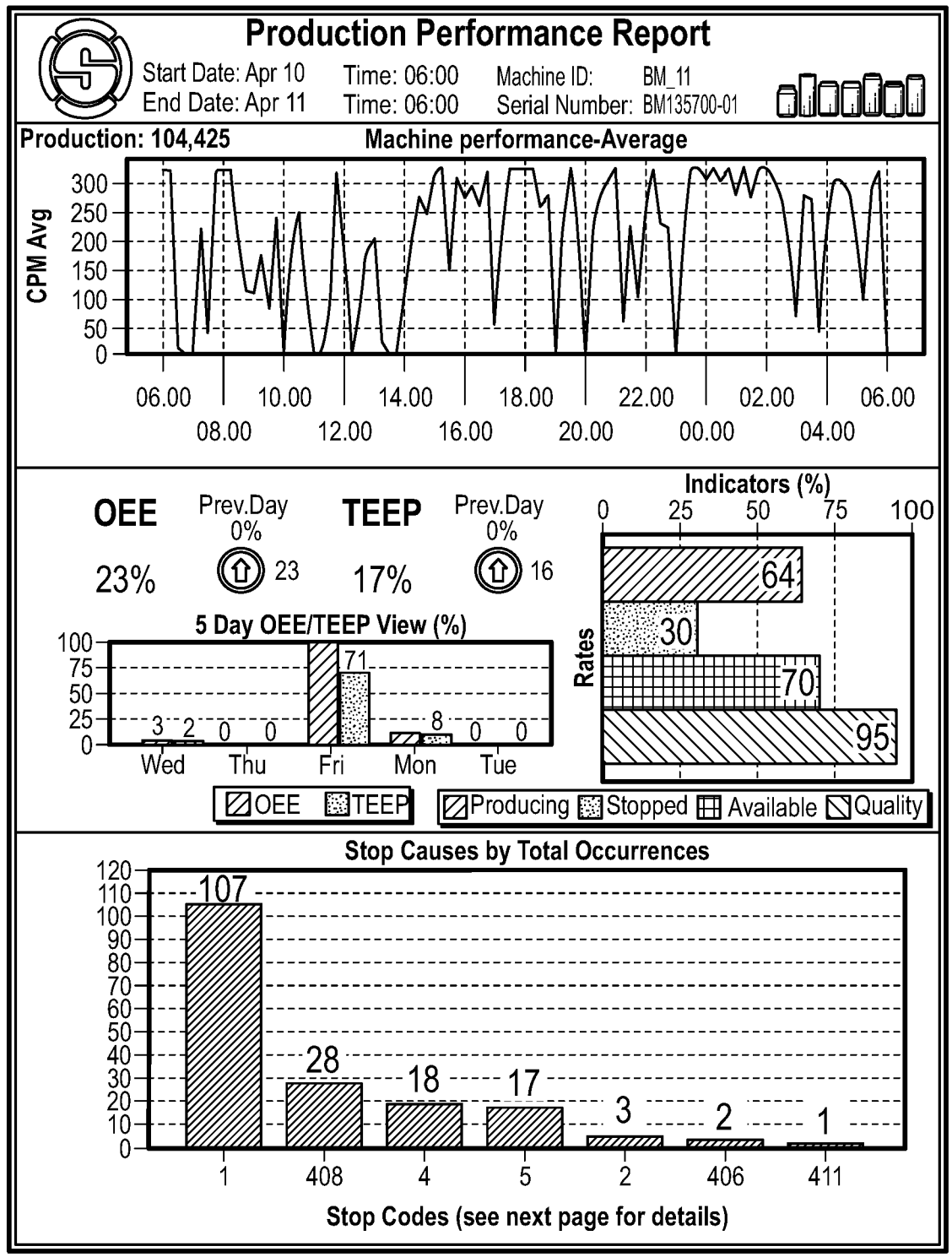
FIGS. 8A-C are example single bodymaker reports in accordance with an example embodiment of the disclosed concept.
Figure 8B:
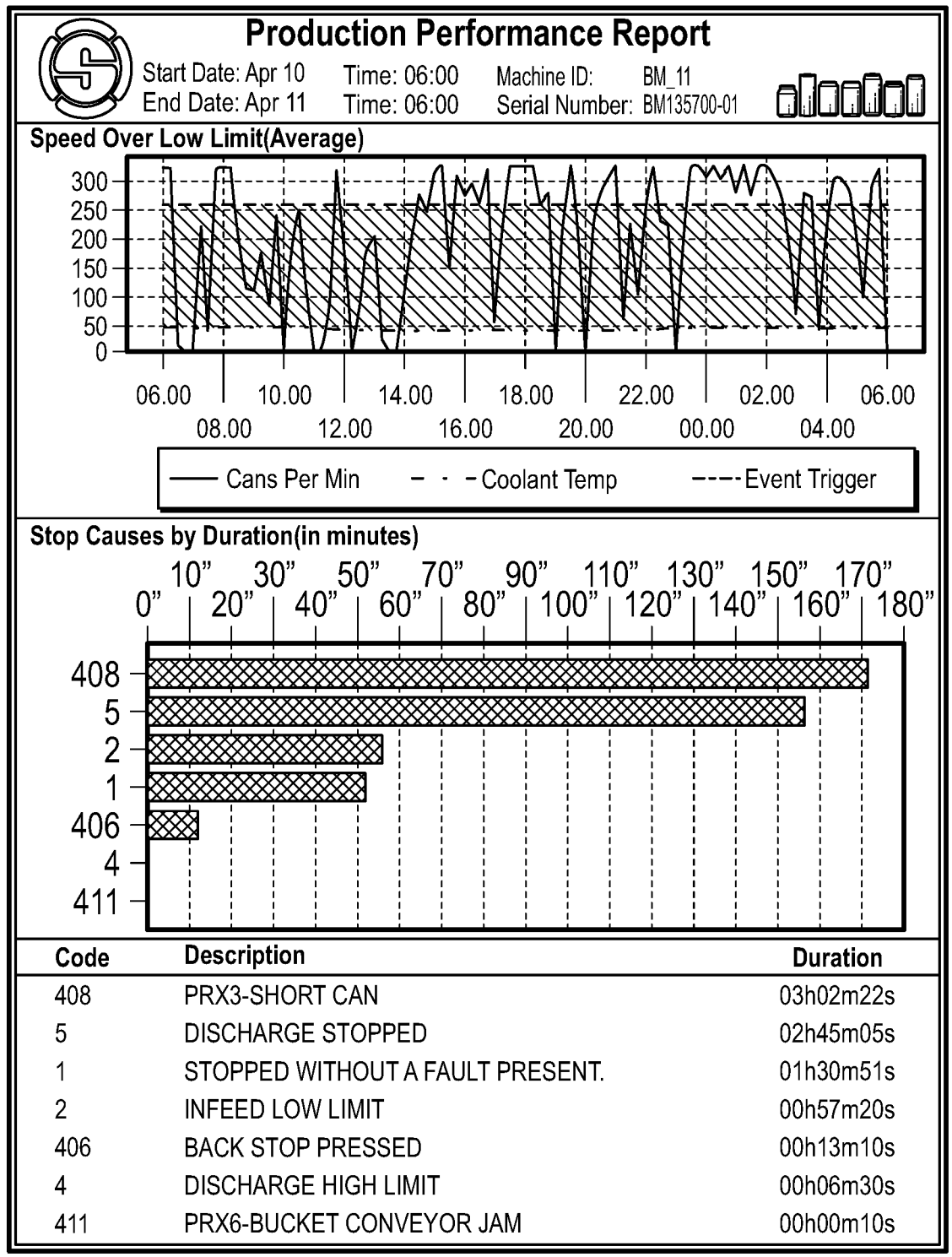
Figure 8C:
Figure 9A:
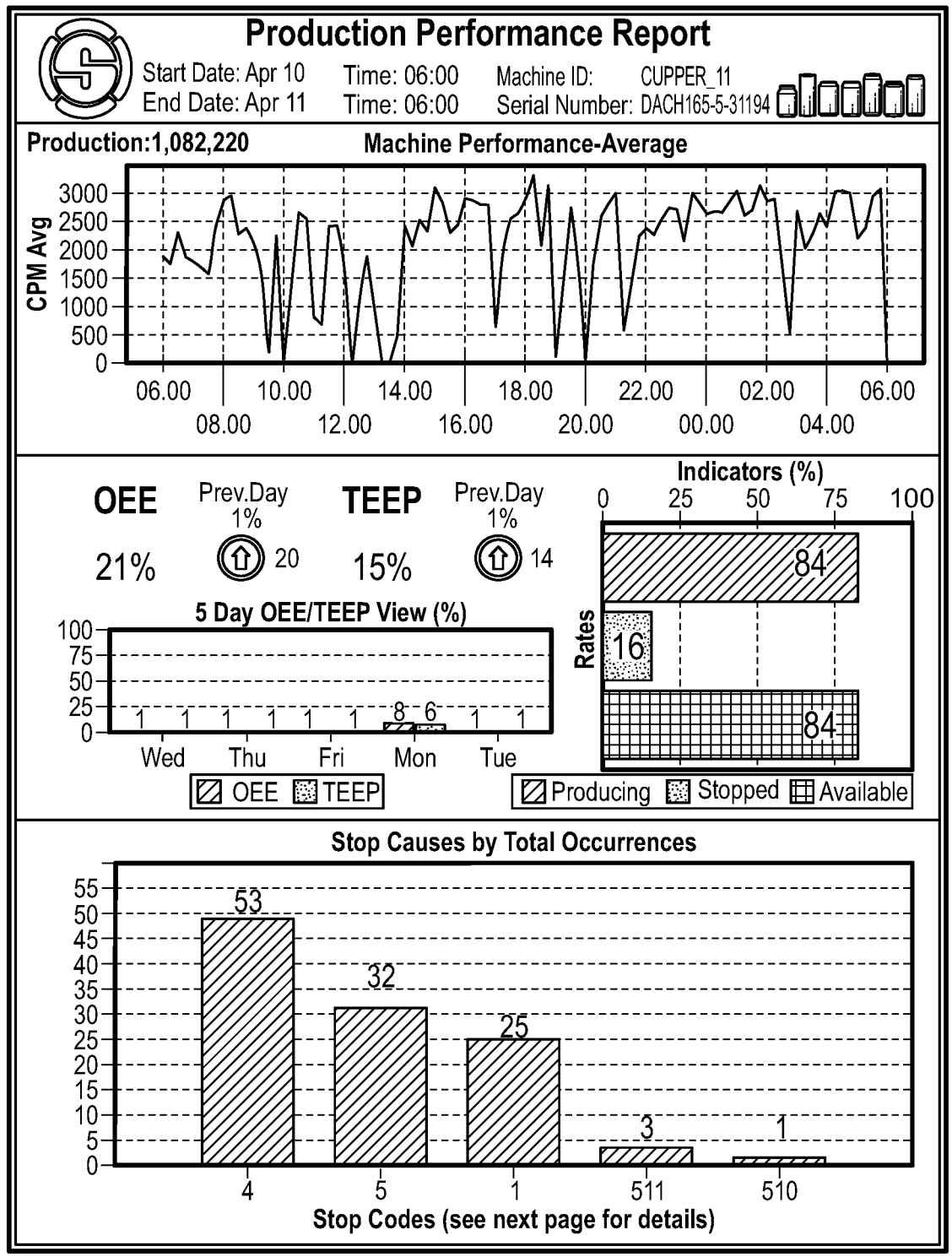
Figure 9B:
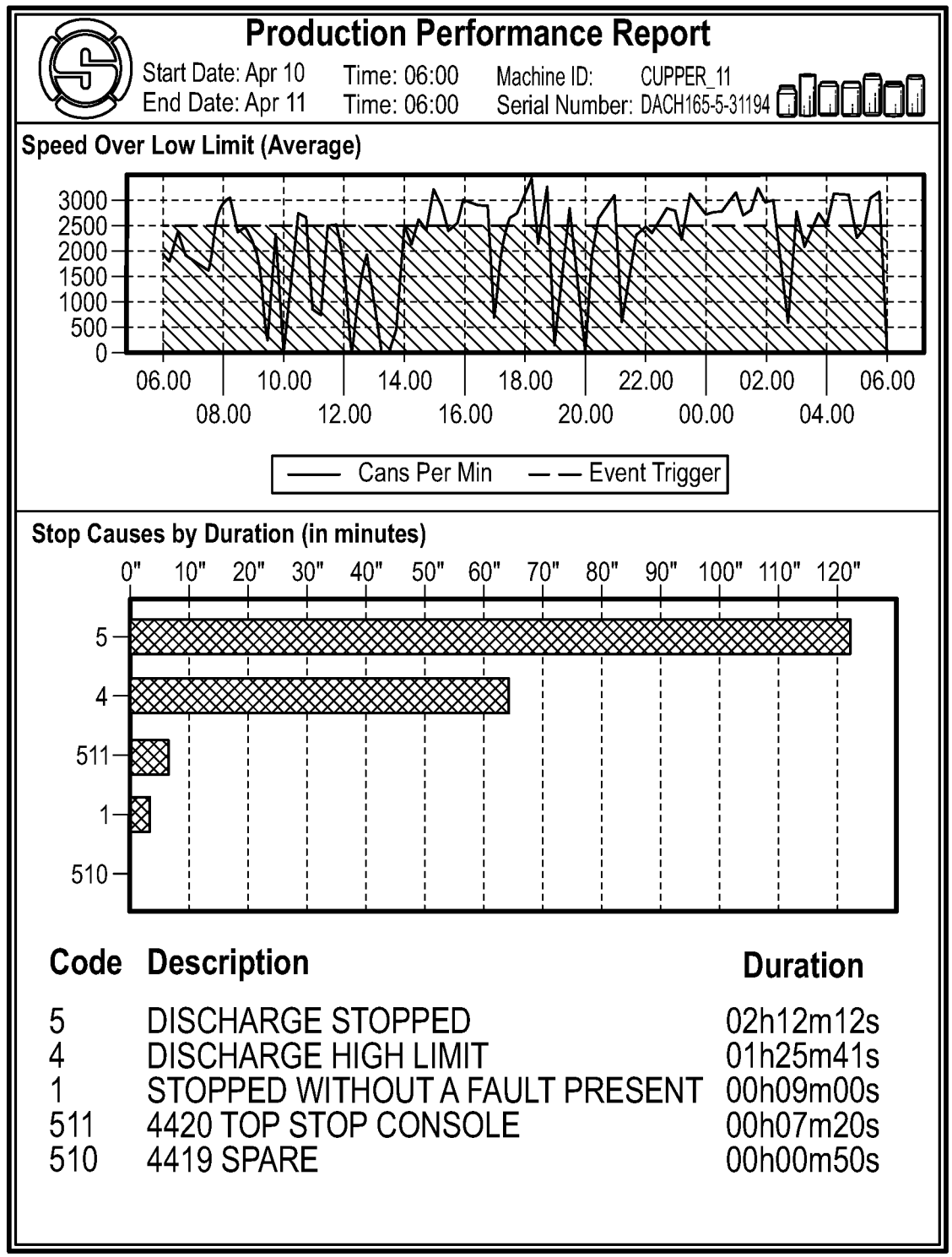
Figure 10A:
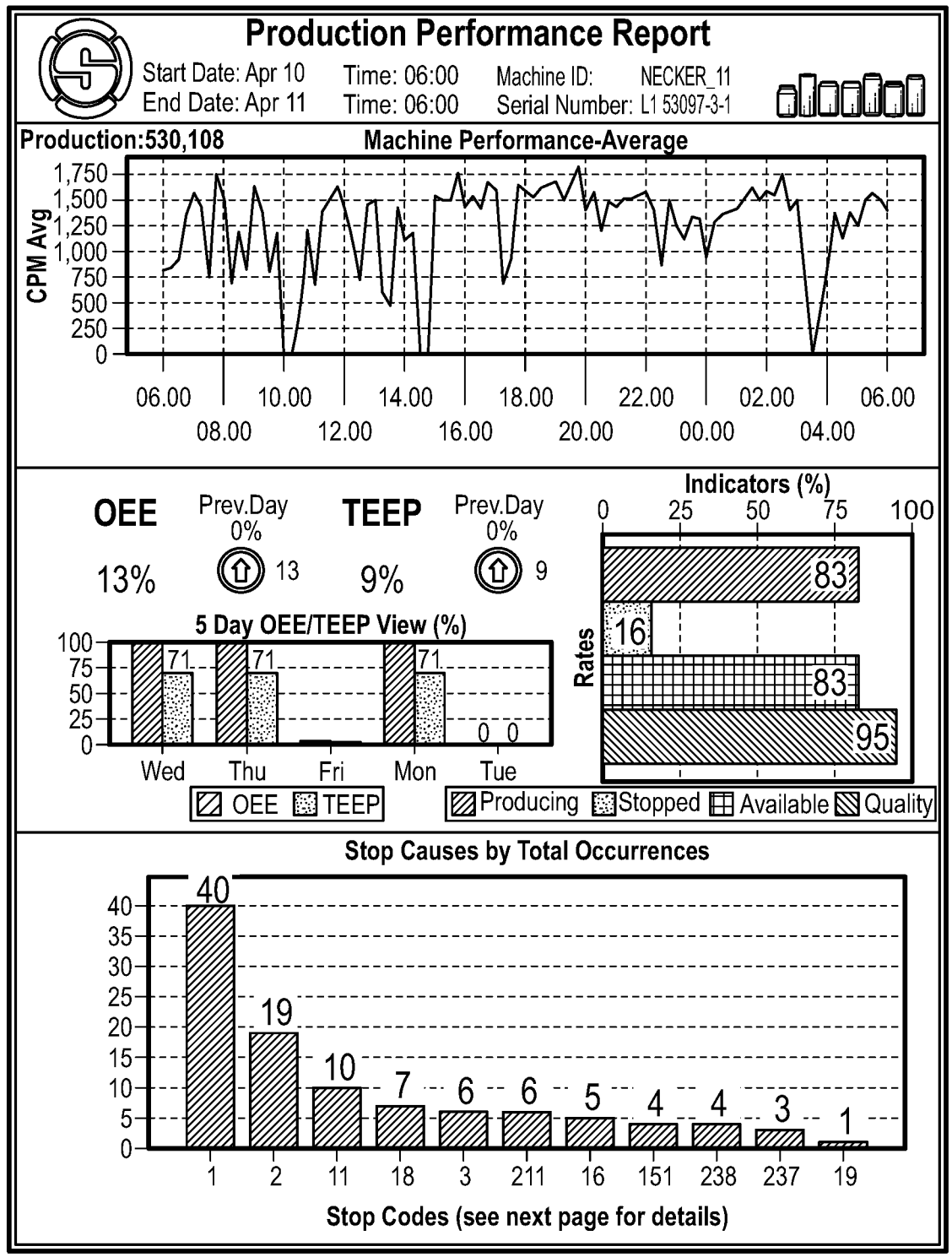
FIGS. 10A-D are example single necker reports in accordance with an example embodiment of the disclosed concept.
Figure 10B:
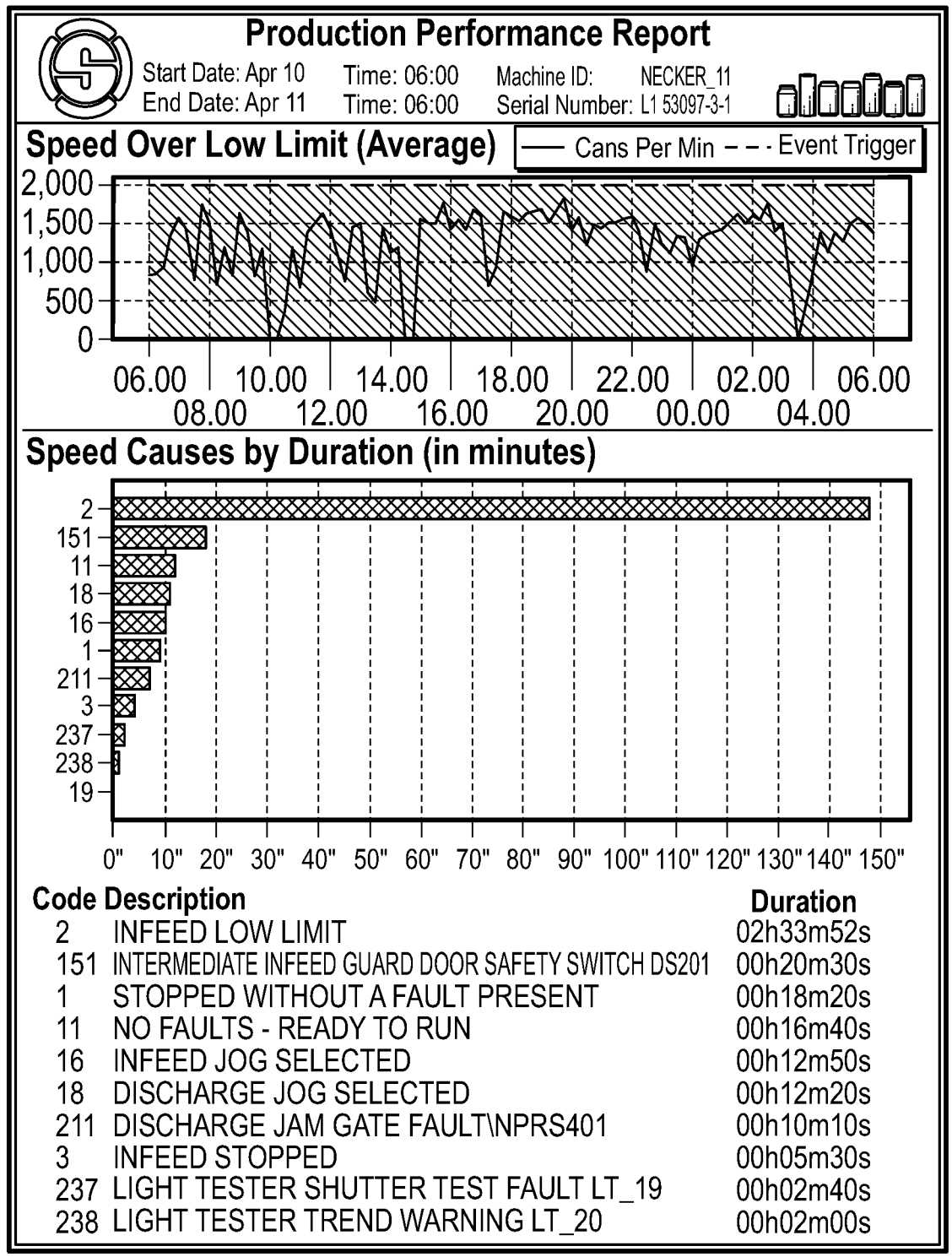
Figure 10C:
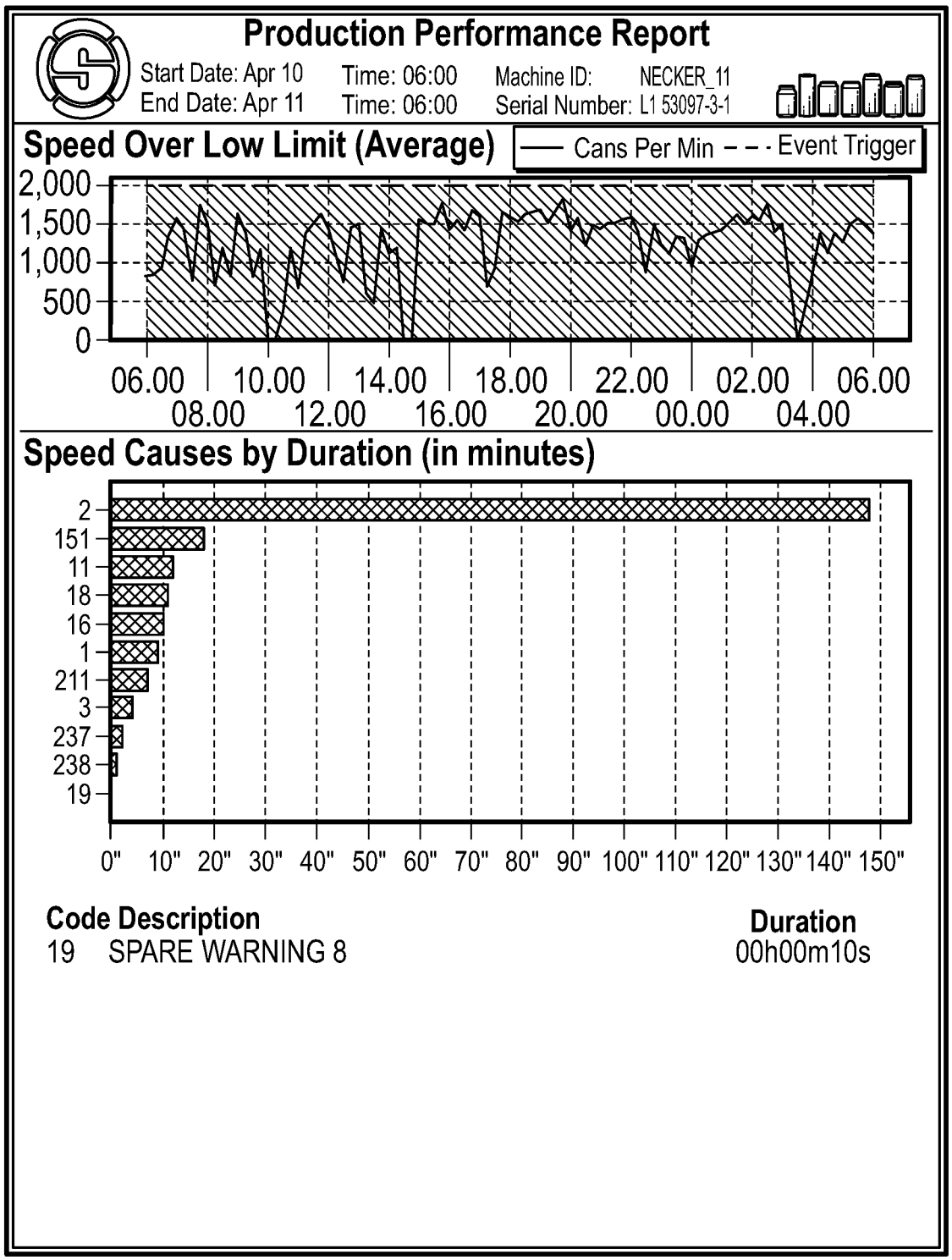
Figure 10D:

FIGS. 7A and 7B are example aggregated bodymaker reports in accordance with an example embodiment of the disclosed concept. FIGS. 8A-C are example single bodymaker reports in accordance with an example embodiment of the disclosed concept. FIGS. 9A-C are example single cupper reports in accordance with an example embodiment of the disclosed concept. FIGS. 10A-D are example single necker reports in accordance with an example embodiment of the disclosed concept. In these example reports, various information gathered from the sensors may be aggregated. The reports may be shown on the user interface or output such that they may be viewed on other devices or mediums. For example, the reports may be output as any suitable file format (e.g., without limitation, PDF) so that they may viewed on different devices. The reports may also be printed so that they may be viewed offline.

By observing and interacting with the user interface and/or by generating reports through the user interface, a user may easily obtain information of various scope about a factory or multiple factories, or about particular machines on a production line in a factory. The information may be used to observe and improve the efficiency of a factory. For example, a user may use the user interface to observe the production of production lines in different factories. If the production line in one factory is underperforming compared to a production line in another factory, the user may use the user interface to display and compare characteristics of particular machines on the production lines. The user may identify a particular machine, or other aspect, that is causing a performance issue and may appropriately address the issue. The gathered data may also be stored and analyzed through machine learning or other techniques to predict failures, predict and optimize maintenance, or to use other methods to improve the efficiency of the factory or factories.

In some example embodiments of the disclosed concept, the processing unit 10 may be used to increase automation of one or more factories. For example and without limitation, the processing unit 10 may act on data it gathers and analyzes. For example and without limitation, the processing unit 10 may determine that maintenance of a machine is needed or will soon be needed based on the gathered and analyzed data. The processing unit 10 may make or initiate a purchase order for materials or parts needed for maintenance of the machine. The processing unit 10 may also make or initiate material orders based on the production of a factory or factories. For example, the processing unit may determine that a factory will need to replenish its stock of aluminum or other materials involved in the production of cans based on the gathered and analyzed data and may pre-emptively and automatically make or initiate a purchase order for materials that will be needed in production. While purchase orders of additional materials are one example of an additional action that the processing unit 10 may take based on its gathered and analyzed data, it is contemplated that a variety of different actions may be taken by the processing unit 10, such as, without limitation, control or adjustment of machines, sending alarms, warnings, or notifications, or any other suitable actions in relation to monitoring or management of factories. It is also contemplated that the user interface may be used by a user to setup or adjust additional actions that the processing unit may automatically take in response to the gathered and analyzed data.

While the disclosed concept is described in relation to the production of cans, it is contemplated that the management and monitoring systems and methods according to various example embodiments of the disclosed concept may also be employed in factories employing similar manufacturing processes or substantially different manufacturing processes without departing from the scope of the disclosed concept.

One or more aspects of the disclosed concept can also be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. A factory management and monitoring system comprising:
    a processing unit structured to receive data from a plurality of sensors structured to monitor a plurality of machines in a can production line of a factory, to analyze the received data, and to generate a user interface including the received data or information resulting from analysis of the received data; and a display structured to display the user interface,
wherein the user interface includes a plurality of views including a first view including received data or information resulting from analysis of the received data associated with a single machine in the factory and a second view including received data or information resulting from analysis of the received data associated with multiple machines in the factory, and
wherein the single machine is a cupper or a necker, and wherein the multiple machines include at least the cupper, the necker, and a bodymaker.

2. The factory management and monitoring system of claim 1, wherein the can production line is a can body production line or a can end production line.

3. The factory management and monitoring system of claim 1, wherein the processing unit is located remotely from the factory.

4. The factory management and monitoring system of claim 1, wherein the processing unit is structured to compare at least one piece of the received data to a predetermined threshold and to generate an alarm in the user interface when the at least one piece of the received data exceeds the predetermined threshold.

5. The factory management and monitoring system of claim 1, wherein the processing unit is structured output one or more commands to control at least one of the plurality of machines.

6. The factory management and monitoring system of claim 1, wherein the processing unit is structured to generate a material or work order based on the received data.

7. The factory management and monitoring system of claim 1, wherein the display is located remotely from the processing unit.

8. The factory management and monitoring system of claim 1, wherein the processing unit is structured to generate one or more reports including the received data or information resulting from analysis of the received data.

9. The factory management and monitoring system of claim 1, further comprising:
an input device structured to receive input from the user, and
wherein the user interface is interactive responsive to inputs received via the input device.

10. The factory management and monitoring system of claim 9, wherein the processing unit is structured to switch between the plurality of views based on input received via the input device.

11. The factory management and monitoring system of claim 1, wherein the received data or information resulting from analysis of the received data includes one or more of a cupper speed, a count of total cups, characteristics of one or more components of the cupper, a necker speed, a count of total unit produced by the necker, characteristics of one or more components of the necker, and characteristics of the bodymaker.

12. A factory management and monitoring method comprising:
receiving, by a processing unit, data from a plurality of sensors structured to monitor a plurality of machines included in a can production line of a factory;
analyzing the received data;
generating a user interface including the received data or information resulting from analysis of the received data; and
displaying the user interface,
wherein the user interface includes a plurality of views including a first view including received data or information resulting from analysis of the received data associated with a single machine in the factory and a second view including received data or information resulting from analysis of the received data associated with multiple machines in the factory, and
wherein the single machine is a cupper or a necker, and wherein the multiple machines include at least the cupper, the necker, and a bodymaker.

13. The factory management and monitoring method of claim 12, further comprising:
comparing, with the processing unit, at least one piece of the received data to a predetermined threshold; and
generating an alarm in the user interface when the at least one piece of the received data exceeds the predetermined threshold.

14. The factory management and monitoring method of claim 12, further comprising:
outputting, with the processing unit, one or more commands to control at least one of the plurality of machines.

15. The factory management and monitoring method of claim 12, further comprising:
generating a material or work order based on the received data.

16. The factory management and monitoring method of claim 12, further comprising:
generating, with the processing unit, one or more reports including the received data or information resulting from analysis of the received data.

17. The factory management and monitoring method of claim 12, wherein the received data or information resulting from analysis of the received data includes one or more of a cupper speed, a count of total cups, characteristics of one or more components of the cupper, a necker speed, a count of total unit produced by the necker, characteristics of one or more components of the necker, and characteristics of the bodymaker.

18. A non-transitory computer readable medium storing one or more programs, including instructions, which when executed by a computer, causes the computer to perform a factory management and monitoring method, the method comprising:
receiving, by a processing unit, data from a plurality of sensors structured to monitor a plurality of machines included in a can production line of a factory;
analyzing the received data;
generating a user interface including the received data or information resulting from analysis of the received data; and
displaying the user interface,
wherein the user interface includes a plurality of views including a first view including received data or information resulting from analysis of the received data associated with a single machine in the factory and a second view including received data or information resulting from analysis of the received data associated with multiple machines in the factory, and
wherein the single machine is a cupper or a necker, and wherein the multiple machines include at least the cupper, the necker, and a bodymaker.

* * * * *